(12) United States Patent
Chheda et al.

(10) Patent No.: US 10,175,976 B1
(45) Date of Patent: Jan. 8, 2019

(54) SYSTEMS AND METHODS FOR AVOIDING VERSION CONFLICT IN A SHARED CLOUD MANAGEMENT TOOL

(71) Applicant: VCE Company, LLC, Richardson, TX (US)

(72) Inventors: Nilay B. Chheda, San Jose, CA (US); Dirk N Milotz, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 116 days.

(21) Appl. No.: 14/801,363

(22) Filed: Jul. 16, 2015

(51) Int. Cl.
G06F 9/44 (2006.01)
G06F 8/71 (2018.01)
G06F 17/30 (2006.01)

(52) U.S. Cl.
CPC .......... *G06F 8/71* (2013.01); *G06F 17/30106* (2013.01)

(58) Field of Classification Search
CPC ... G06F 8/71; G06F 9/44521; G06F 17/30106
See application file for complete search history.

(56) References Cited

U.S. PATENT DOCUMENTS

| | | | | |
|---|---|---|---|---|
| 5,897,642 A * | 4/1999 | Capossela | ................ | G06F 8/71 |
| 5,983,277 A * | 11/1999 | Heile | ................ | G01R 31/3177 |
| | | | | 709/215 |
| 7,707,153 B1 * | 4/2010 | Petito | ................ | G06Q 10/06 |
| | | | | 707/999.101 |
| 8,255,363 B2 * | 8/2012 | Johnson | ................ | G06F 8/71 |
| | | | | 707/624 |
| 9,430,229 B1 * | 8/2016 | Van Zijst | ................ | G06F 9/3844 |
| 2001/0051962 A1 * | 12/2001 | Plotkin | ................ | G06F 17/243 |
| | | | | 715/229 |
| 2003/0145020 A1 * | 7/2003 | Ngo | ................ | G06F 17/30174 |
| 2004/0158486 A1 * | 8/2004 | Nudd | ................ | G06Q 10/10 |
| | | | | 705/3 |
| 2006/0010103 A1 * | 1/2006 | Malik | ................ | G06F 17/30194 |
| 2006/0026567 A1 * | 2/2006 | McVoy | ................ | G06F 8/71 |
| | | | | 717/120 |

(Continued)

OTHER PUBLICATIONS

NPL-Subversion-Pre-commit-2014, located at http://svnbook.redbean.com/en/1.7/syn.ref.reposhooks.pre-commit.html Captured in 2014.*

(Continued)

*Primary Examiner* — Hossain M Morshed
(74) *Attorney, Agent, or Firm* — Polsinelli PC

(57) ABSTRACT

Aspects of the present disclosure involve systems and methods for avoiding conflicts between versions of an editable binary file from a shared repository of system management files, workflows, and/or items. In particular, a computing environment may include a development tool for altering the item and a standby development tool that maintains the latest version of the item. The computing environment is configured to execute a pre-commit script or program that checks a version number of the edited item to a version number of the item maintained by the standby development tool such that changes made to the item are only committed when the item has not been edited or changed by another user to the shared repository. In this manner, conflicts between versions of the binary file may be avoided such that each user's alterations to the file or item from the infrastructure management tool are properly committed.

17 Claims, 6 Drawing Sheets

(56) References Cited

U.S. PATENT DOCUMENTS

| | | | |
|---|---|---|---|
| 2006/0101092 A1* | 5/2006 | Ishida | G06F 8/71 |
| 2006/0136511 A1* | 6/2006 | Ngo | G06F 17/2288 |
| 2006/0236319 A1* | 10/2006 | Pinnix | G06F 8/71 |
| | | | 717/170 |
| 2008/0092129 A1* | 4/2008 | Prakash | G06F 8/433 |
| | | | 717/162 |
| 2008/0215968 A1* | 9/2008 | Bekerman | G06F 8/53 |
| | | | 715/255 |
| 2009/0106307 A1* | 4/2009 | Spivack | G06Q 30/02 |
| 2011/0082833 A1* | 4/2011 | Kamimura | G06F 17/30348 |
| | | | 707/624 |
| 2013/0151231 A1* | 6/2013 | Giraudy | G06F 17/28 |
| | | | 704/2 |
| 2013/0332511 A1* | 12/2013 | Hala | H04L 67/34 |
| | | | 709/203 |
| 2014/0082605 A1* | 3/2014 | Arssov | G06F 8/76 |
| | | | 717/174 |
| 2014/0379853 A1* | 12/2014 | Shelton | G06F 9/4868 |
| | | | 709/217 |
| 2015/0220327 A1* | 8/2015 | Poon | G06F 17/30297 |
| | | | 717/120 |
| 2015/0301824 A1* | 10/2015 | Patton | G06F 8/71 |
| | | | 717/122 |
| 2015/0310188 A1* | 10/2015 | Ford | G06F 21/10 |
| | | | 726/28 |

OTHER PUBLICATIONS

Subversion, "Control with Subversion", 2014, located at http://svnbook.red-bean.com/en/1.7/svn.ref.reposhooks.pre-commit.html.*

* cited by examiner

SYSTEMS AND METHODS FOR AVOIDING VERSION CONFLICT IN A SHARED CLOUD MANAGEMENT TOOL

TECHNICAL FIELD

Aspects of the present disclosure relate to configuration of various computing components, among other functions, and more particularly to configuring cloud management tools in a computing environment.

BACKGROUND

Widespread adoption of virtualization is rapidly revolutionizing the ways information technology ("IT") departments procure, implement, and operate technology. As such, converged infrastructures provide dynamic pools of computing resources that are intelligently provisioned and managed to address changing demands of customers. For example, a converged infrastructure may include pools of compute, storage, and network devices that may be shared and accessed by multiple applications. Integrating, validating, and managing such components is often a drain on IT resources. Accordingly, pre-configured, pre-integrated, and validated infrastructures are highly desirable to customers. Generally, such converged infrastructures include a management tool that allows administrators of the infrastructure to manage components and adapt and extend services to one or more users of the infrastructure.

SUMMARY

Implementations of the present disclosure include a method for managing a computing system. The method includes obtaining a first binary file and a first version number of the first binary file from a shared repository, the first binary file associated with the management of a computing system, loading the first binary file and the first version number of the first binary file in development tool program, and receiving edits to the first binary file from the development tool program, the edits comprising an updated version number of the first binary file. The method further includes storing a second version number of the first binary file in a local repository through standby development tool program, the second version number of the first binary file obtained from the shared repository, comparing the updated first version number of the first binary file in the development tool program to the second version number of the first binary file in the standby development tool program, and committing the edits to the first binary file in the shared repository if the updated first version number of the first binary file is more than the second version number of the first binary file. Other implementations of the present disclosure include one or more non-transitory tangible computer-readable storage media storing computer-executable instructions for performing a computer process on a computing system to perform one or more of the operations above.

DETAILED DESCRIPTION

Aspects of the present disclosure involve a computing system and/or method for avoiding a conflict between versions of an editable binary file from a shared repository of system management files, workflows, and/or items. In one particular embodiment, the shared repository may store files and/or applications of a converged infrastructure management system or tool. In general, the computing system and method include opening a development operating system that is utilized to edit a file from the shared repository and a standby operating environment similar to development operating system. The development operating environment is configured to execute a pre-commit script or program that checks a version number of the edited document to a version number of the document in the shared repository. More particularly, the standby operating environment periodically updates the stored binary file of the standby operating environment to the latest version stored in the shared repository. When a binary file is attempted to be committed to the shared repository from the development operating system, the development operating environment executes a pre-commit procedure that compares the version number of the edited file from the development operating environment to the latest version number of the file obtained by the standby operating environment from the shared repository. Changes made to the file are then only committed when the file has not been edited or changed by another user to the shared repository during the time the file was being edited in the development operating environment. In this manner, conflicts between versions of the binary file may be avoided such that each user's alterations to the file or item from the infrastructure management tool are committed.

The various systems and methods disclosed herein provide for configuring a management tool for one or more components of a converged infrastructure. It will be appreciated that, although some of the example implementations described herein involve management of a converged infrastructure system, the system and methods described herein may apply to any type of computing system or computing network where scripts, workflows, items, or the like are created, edited, and shared among users to manage services and features of the computer system.

Figure 1:
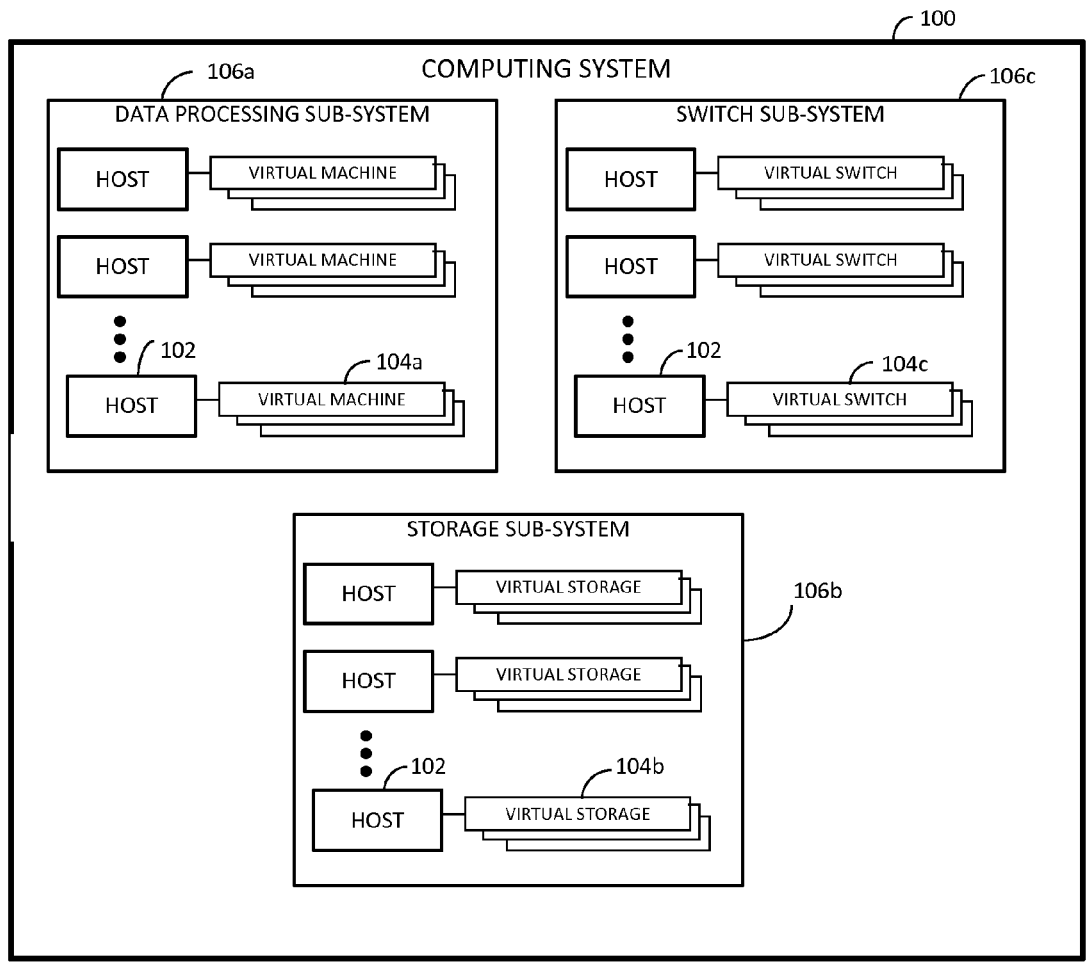
FIG. 1 illustrates an example computing system that may be implemented as a computing node of a distributed computing environment according to one embodiment of the present disclosure.

As mentioned above, the computing system and/or method for avoiding a conflict between versions of an editable binary file from a shared repository of system management files, workflows, and/or items for managing the computing system may be, in one embodiment, a converged infrastructure. Thus, FIG. 1 illustrates an example computing system 100 that may utilize the version conflict avoidance method and system described herein. In one embodiment, multiple computing systems 100 as described herein may be configured to communicate with one another using a communication network to form at least a portion of a distributed computing environment.

The computing system 100 may be any type having multiple hosts 102 that each executes one or more virtual objects (e.g., virtual machines 104a, virtual storage objects 104b, and virtual switch objects 104c). The hosts of a computing system are often referred to as compute servers. Nevertheless, in this disclosure, the term 'host' may be interpreted as any physical device and/or component that supports the operation of virtual resources and services provided by those virtual resources. The particular computing system 100 as shown includes several sub-systems, such as a data processing sub-system 106a, a data storage sub-system 106b, and a switch sub-system 106c. Nevertheless, it should be understood that computing system may include additional, fewer, or different types of sub-systems without departing from the spirit and scope of the present disclosure.

In one particular implementation, the computing system may be a converged infrastructure system, an integrated computing system, or another computing system having hundreds of components, such as compute components (e.g., Cisco®, Intel®, or IBM® blade appliances), storage components (e.g., EMC® static and dynamic storage drives), network components (e.g., Cisco® switches/gateways/routers) or virtualization components (e.g., VMware® VMs) components. Many of these components do not inherently interact with each other. Accordingly it could take months for an IT team to properly configure and test the system as a whole to operate properly. Such a computing system might be a VCE Vblock® System from VCE® Company, LLC, which is located in Richardson, Tex.

In one aspect, the converged infrastructure 100 includes a combination of sub-systems discussed above or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 100 such as that shown includes components found in VBLOCK™ System infrastructure packages available from VCE, LLC, which is located in Richardson, Tex.

In one embodiment of the converged infrastructure, the data storage sub-system 106b includes computer-readable memory structures for storing data used by the converged infrastructure 100, which may include network attached storage (NAS) arrays and/or storage area network (SAN) arrays that are facilitated by multiple virtual objects (e.g., virtual storage objects 204b). The switch sub-system 106c provides for communication among the various sub-systems of the converged infrastructure 100, and may include components, such as fabric interconnect systems, Ethernet switches/routers, multilayer director switches (MDSs), and the like. The data processing sub-system 106a executes applications that access, store, and otherwise manipulate data stored by the converged infrastructure 100. For a particular example, either of the data storage sub-system 106b, the switch sub-system 106c, and/or the data processing sub-system 106a may comprise a blade computing platform having multiple hosts (e.g., blade computing devices) that each executes one or more virtual objects.

Each sub-system may include multiple hosts 102 that each executes one or more virtual objects, which in this particular example, are virtual machines (VMs) 104a, virtual storage objects 104b, and virtual switch objects 104c. For example, virtual objects, such as the VMs 104a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™® software suite that is available from VMware® corporation, which is located in Palo Alto, Calif.

In one embodiment of the converged infrastructure, a development tool or development software may be made available to administrators and/or users of the converged infrastructure. Through the development tool, an administrator may create automation scripts for complex information technology task. In general, the development tool provides a software suite to manage the components and services of the converged infrastructure to provide such services to users of the infrastructure. For example, the development tool may be utilized by a user of the tool to create one or more scalable workflows to manage the components and services of the converged infrastructure. One example of a suitable development tool includes the vRealize Orchestrator software suite that is available from VMware® corporation, which is located in Palo Alto, Calif.

In one embodiment, the development tool for the computing system may store workflows, files, and/or items in a shared repository available to several users of the development tool. Such a shared repository may be available to geographically disparate users that access the shared repository from their particular versions of the development tool operating on the user's individual computing systems. For example, a particular workflow may be obtained and edited from a first user through a version of the development tool accessed through and running on the first user's computing device, such as a laptop. Similarly, the same particular workflow may be obtained and edited from a second user through a second version of the development tool accessed through and running on the second user's computing device. The first user and the second user may be located in the same building or may be located in separate cities. Because the workflow is stored and accessible through the shared repository, edits made to the workflow by one user may be seen and accessed by a second user. Through this collaboration effort, the workflow may be created and edited by the various users of the development tool that have access to the workflow to manage some aspect of the converged infrastructure. However, as explained in more detail below, conflicts between versions of the workflow may occur as the multiple users of the development tool access and edit the workflow.

Figure 2:
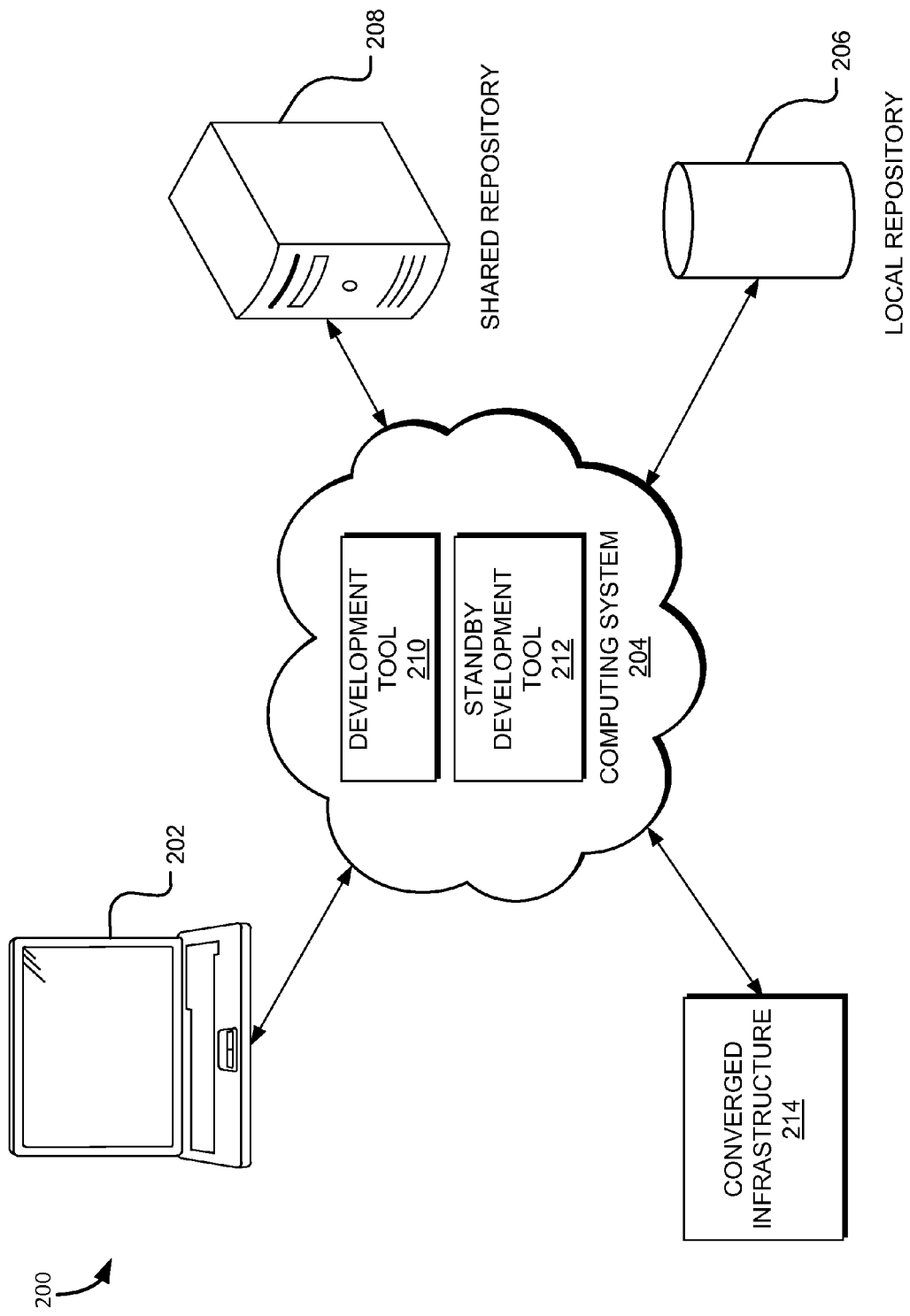
FIG. 2 illustrates an example computing system for managing workflows of a shared repository of a converged infrastructure management tool.

FIG. 2 illustrates an example computing environment 200 for managing workflows of a shared repository of a converged infrastructure management tool. Although certain components of the computing environment 200 are shown, it should be appreciated that other embodiments of the environment more or fewer components may be included in the environment. In addition, the environment 200 may be a portion of, connected to, or otherwise in communication with the converged infrastructure 214 discussed above with reference to FIG. 1. Therefore, through the use of the components of the computing environment 200, one or more workflows for managing the components and/or services provided by a converged infrastructure may be created by administrators and/or users of the environment.

The environment 200 includes a computing device 202, such as a laptop, that a user or administrator of a managed converged infrastructure may access a computing system 204. In one embodiment, the computing system 204 may be included and be executed on the user's computing device 202. In another embodiment, the computing system 204 may be executed in as a virtual machine in a cloud computing environment. In such an embodiment, the computing device 202 may access the computing system 204 through some communication interface between the user's computing device and the computing system.

Regardless of the embodiment utilized, the computing system 204 may be in communication with one or more other components of the environment 200. For example, the computing system 204 may be in communication with a shared repository 208. The shared repository 208 stores and manages one or more workflows, files, items, actions, configurations, and the like for a computing environment, such as a converged infrastructure 214. The computing system 204 communicates with the shared repository through some network connection between the computing system and the repository. In one embodiment, the network connection between the components is the Internet. In another embodiment, the network connection between the components is a virtual local area network (VLAN).

Similarly, the computing system 204 may be in communication with a local repository 206. In general, the local repository 206 is a storage device or devices associated with a user of the computing system 204 that the user utilizes to store versions of and edits to items of the infrastructure management system tool. Other information that may be utilized by a user of the computing system 204 when updating, altering, or editing an item of the infrastructure management system tool may also be stored in the local repository 206 associated with the user. In one embodiment, the local repository 206 associated with a particular user may not be visible or accessible to other users of the shared repository 208.

As mentioned above, the computing system 204 may be utilized to manage workflows or items from a converged infrastructure management tool. In particular, the computing system 204 may include a development tool 210 that provides the user with an interface and platform through which shared workflows and/or items may be obtained and edited or altered. For example, the development tool 210 may be executed in the computing system 204 and accessed by a user of the computing device 202. Through the development tool, workflows may be created or edited by the user. Further, because an instance of the development tool 204 may also be executed on a computing device of another user, the alterations to the items stored in the shared repository 208 may be collaborative.

In one particular embodiment, the development tool 204 may obtain a shared item from the shared repository 208 and store the item in the local repository 206 associated with the user. Edits or changes to the obtained item may be received from the user or administrator through the development tool 204 and applied to the locally stored version of the shared item in the local repository. Upon completion of the changes to the item, the user may direct the development tool 204 to return the item to the shared repository 208 with the alterations. However, because the item is shared among the users of the shared repository, conflicts in varying changes to the item may occur, as explained in more detail below. In the above manner, one or more administrators of the converged infrastructure 214 may collaboratively create an item, such as a workflow, for the converged infrastructure for administration of the infrastructure.

As mentioned, due to the shared nature of the items in the shared repository 208, conflicts in changes and/or versions of a shared item may occur. For example, the development tool 210 may be configured to provide a version number to a file of the shared repository 208. However, certain items of the file, when uploaded into the development tool 210, may be provided with a separate version number than the file version number. This is because the version number provided to the item by the development tool 210 is not necessarily forwarded to the file of the item. Thus, the file version number provided by the shared repository 208 may be different than the updated item version number as provided by the development tool 210. Further, the shared repository 208 or the development tool 210 may only commit changes made to the item if the file version number is greater than the version stored in the shared repository.

The above procedure, however, may result in some changes made to an item being lost or discarded when an item is attempted to be committed. For example, assume a first user and a second user of the shared repository 208 access the same shared item to work on the item. Upon retrieval from the shared repository, the file with the shared item is stored in the local repository (known as the "repository version of the file") for the respective users. Also, the item may be uploaded into the user's respective development tools (known as the "file version of the file") along with a version number for the item, such as item version 1.1.1. In one particular example, the development tools are orchestrators, such as vRealize, that is available from VMware corporation, which is located in Palo Alto, Calif. The orchestrator allows the export of the workflows to the local file system. With the latest file version 1.1.1 of the binary file stored in the local repository and user's development tools, the first user may alter the item, update the version number to 1.1.2, exports the updated file to his local repository, and commits the file to the shared repository. The second user, at this point, has a stale version of the file in his local repository, as well as the user's development tool. The second user then alters version 1.1.1 of the item, updates the version number, and attempts to export the item and commit the changes. However, because the second user's versioning system version of the file is greater than that in the second user's local repository, the second user's development tool will not commit the changes. In response, the second user may update the local repository of the second user with the latest file version number. Also, the second user's development tool or orchestrator does not include the updates made by the first user. The second user exports the file, giving the file in the second user's local repository a higher versioning system version number than the one stored in the shared repository. The second user may now successfully commit the changes to the file. However, the updated item exported by the first user is lost as the altered item from the second user is uploaded to the shared repository 208. In other words, the updated item from the second user supplants the updated item from the first user in the shared repository 208. This is, in part, because the item is a binary file that cannot be merged into an existing binary file in the shared repository. As such, the binary file types of the items in the shared repository 208 are subject to conflict when updating by more than one user of the system.

Figure 3:
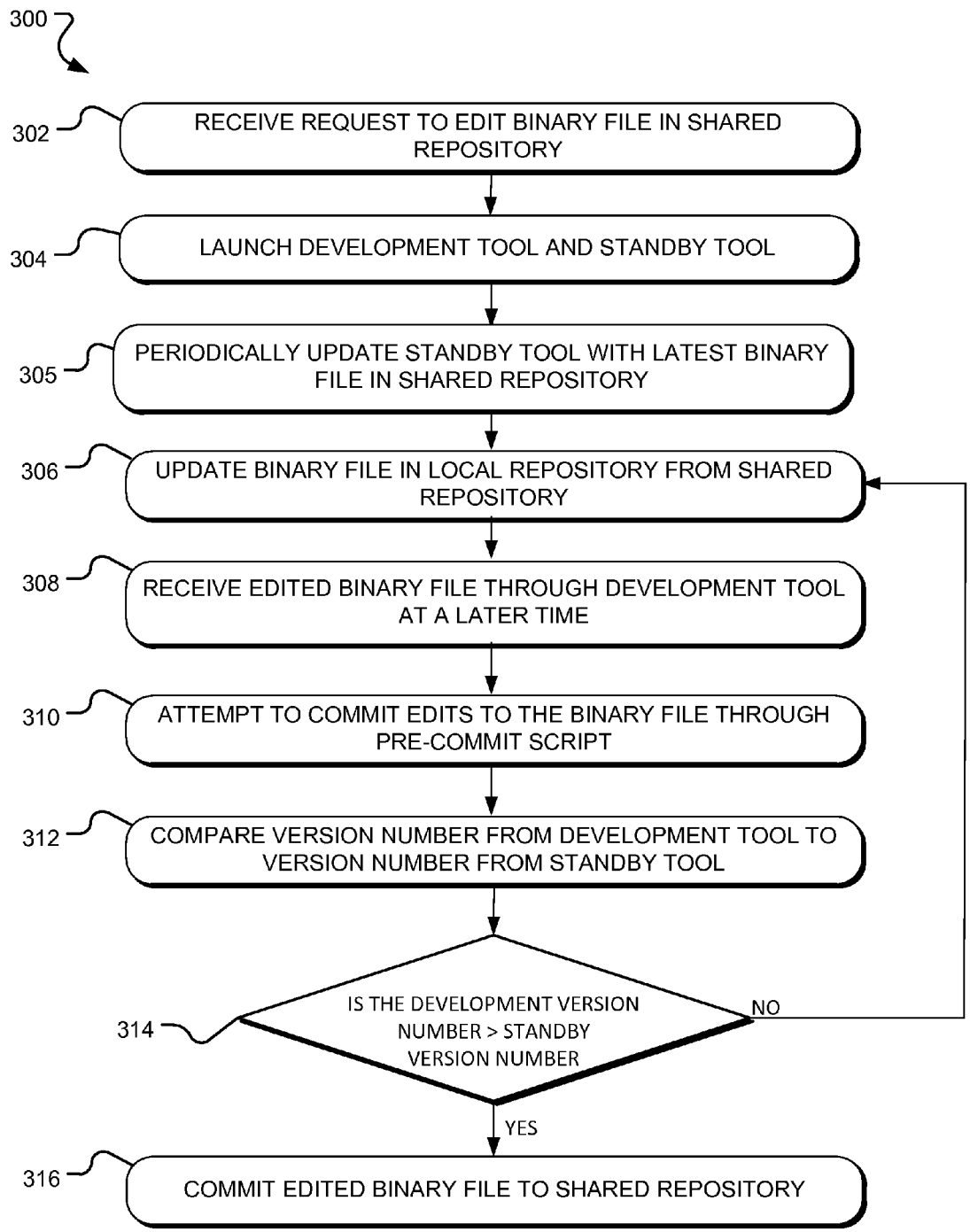
FIG. 3 is a flowchart of a method for a computing system to maintain versions of one or more items of a converged infrastructure management tool.

To address this conflict in versions of the items in the shared repository and development tools during editing or updating of the items, the computing system 204 may include a standby development tool 212. In one embodiment, the standby development tool 212 may operate in a similar manner as the development tool 210. However, through a pre-commit script executed on the standby development tool 210, the standby development tool may operate as a reference development tool that prevents conflicts in items when being updated by users of the computing system 204. FIG. 3 is a flowchart of one method for a computing system to maintain versions of one or more items of a converged infrastructure management tool when updateable by two or more users of the management tool. In general, the operations of the method illustrated in FIG. 3 are performed by the computing system 204 and/or the user's computing device 202. Further, the operations may be performed through the execution of one or more programs, through one or more hardware components arranged in a circuit, or through a combination of both hardware and software components.

Beginning in operation 302, the computing system receives a request to edit an item that is available from or otherwise stored in a shared repository 208. In one example, the request is received from a user interacting with a program executed on the user's computing device 202. The requested item may be any type of computer file, such as a workflows, actions, configurations, etc. Further, in one embodiment, the item may be related to the administration and/or management of a converged infrastructure system 214. Such an item may be a binary computing file that is editable by one or more users of the shared repository 208. In particular, users of the shared repository 208 may access one or more items stored in the shared repository to collaborate on the creation and/or editing of the item. In this manner, the requested item may or may not also be obtained and altered by another user of the computing system 204 and/or the shared repository 208.

In operation 304, the computing system 204 launches a development tool that the user may interact with to alter or view the item. In general, the development tool 210 provides the user with an interface and platform through which shared workflows and/or items may be obtained and edited or altered. Also, the computing system 204 may launch a corresponding standby development tool 212. In general, the standby development tool 212 may operate similarly and have similar capabilities as the development tool. The standby development tool 212 may, however, act as a reference development tool to prevent conflicts in updated items of the computing system 204.

Figure 4:
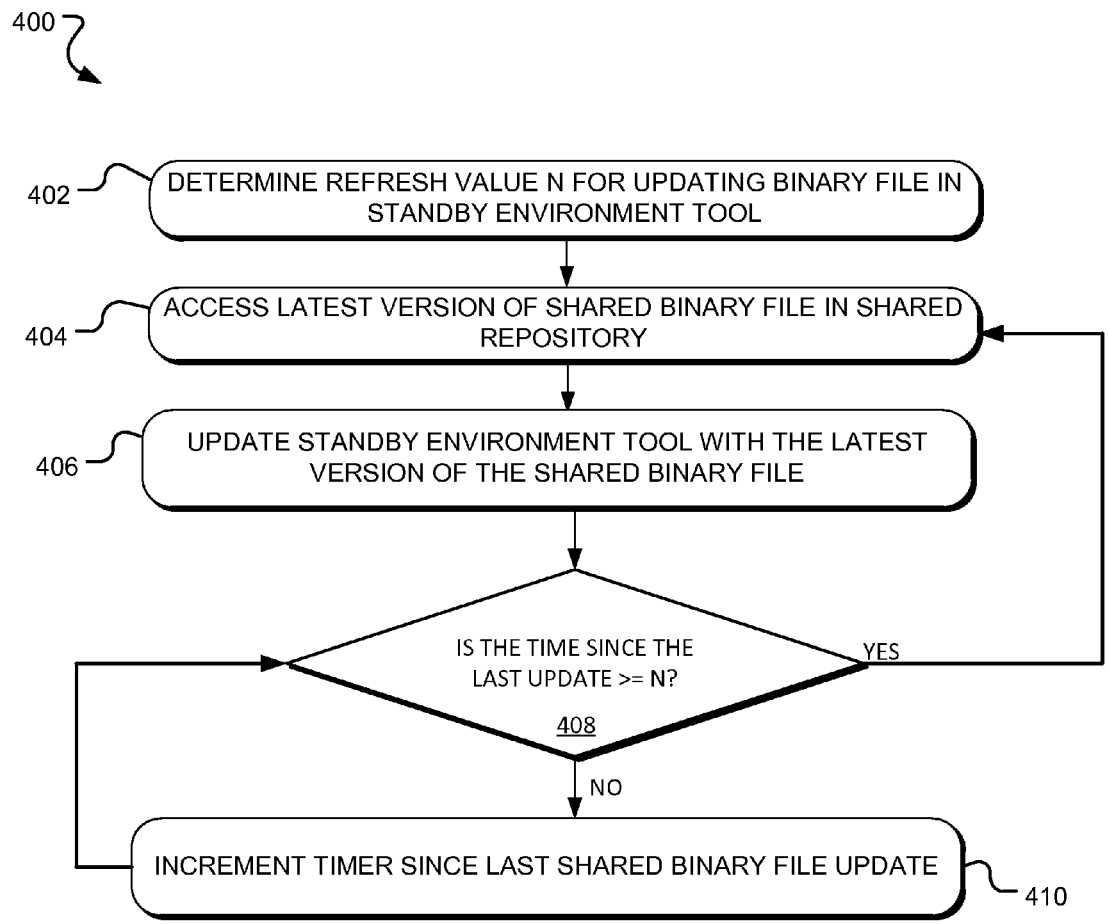
FIG. 4 is a flowchart of a method for a process for a standby development tool to periodically update a binary file version number.

In one embodiment, the standby development tool 212 is periodically updated with the latest binary file stored in the shared repository in operation 305. As discussed below, the development tool 210 may be utilized to update the shared binary file. During such updating or editing of the binary file, the standby development tool 212 may periodically obtain the version of the binary file being edited that is stored in the shared repository. In particular, FIG. 4 is a flowchart of a method for a process for a standby development tool 212 to periodically update a binary file version number. The operations of the method of FIG. 4 may be performed by the computing system during operation 305 discussed above.

Beginning in operation 402, the computing system determines a refresh value "N" for updating the binary file in the standby development tool 212. In one embodiment, N may be provided by a user of the computing system. In another embodiment, N may be a default value for the standby development tool 212 or otherwise determined by the computing system. In operation 404, the standby development tool 212 accesses the latest version of the shared binary file from the shared repository. In one embodiment, the shared binary file includes a version number associated with the binary file. In operation 406, the standby environment tool 202 updates the binary file in the standby environment tool with the obtained shared binary file. In operation 408, the computing system determines if the time since the last update is less than or equal to refresh value N. If not, the computing system continues to increment a timer since the last update was performed in operation 410. If the time since the last update is greater than the refresh value N, the process returns to operation 404 and accesses the latest version of the shared binary file and updates the standby environment tool 212 accordingly. In this manner, the standby development tool 212 is periodically updated with the latest version of the shared binary file for comparison to the edited binary file when attempting to commit the edits to the file in the shared repository.

Returning to FIG. 3, the computing system 204 stores the latest version number of the item in the local repository of the computing system in operation 306. The version number of the item may be stored in the local repository 208 along with the shared item or file. Thus, when the shared item is accessed, the item version may also be obtained. Further, the item may be a part of or otherwise associated with a larger file, such as a workflow item being associated with a larger converged infrastructure management interface. As such, the item may have a version number that is different than the version number of the larger file. The file version number may also be stored in either the development tool 210 and/or the standby development tool 212. In one embodiment, the item, file, and/or version numbers of either may be stored in the local repository 206 of the computing system 204 or user computing device 202. Further, the version number for either the item or the larger file may be in any form that denotes a particular version of the item or file saved to the shared repository 208. Upon storing the item version number, the item may be accessible through the development tool 210 by the user to edit the item.

After some time, the computing system 204 receives an updated or altered item from the development tool 210 in operation 308. In one embodiment, the item is updated by a user through the user's computing device 202. Further, because the item has been altered, the updated item may include a new version number that is higher than the version number received from the shared repository 208 and stored in the local repository 206 mentioned above. This altered version of the item may then be attempted to be committed to the shared repository 208 as the most recent version of the item. Thus, in operation 310, the computing system 204 attempts to commit the edits to the binary file through the execution of a pre-commit script. In particular, during the time that the user was editing the item, another user with access to the shared repository 208 may have accessed the stored item, altered the item, and committed the changes to the item into the shared repository 208. In this example, the item stored in the shared repository 208 has a higher version number than the version number of the item being altered by the user on the user's computing device 202. As such, the shared repository 208 may have stored a more recent version of the item that includes changes to the item that the development tool 210 of the user may not be aware. Storing the latest version number of the item in the standby development tool 212 allows the changes made to the item by the user to be maintained in the development tool 210 while allowing for the standby development tool to check on the latest version of the item.

As discussed above, the standby development tool 212 is configured to update the tool with the latest version number of the item periodically while the item is open in the development tool 210. The frequency at which the standby development tool 212 updates the version number of the item may be based on in input provided by the user of the computing device 202 or may be programmed into the standby development tool. In another embodiment, the standby development tool 212 access the shared repository 208 to obtain the latest version number of the item when a pre-commit script is executed, or when the development tool 210 attempts to commit changes to the item.

As part of a pre-commit check executed by the computing system 204, the system compares the version number of the item stored in the development tool 210 with the latest version number stored of the item stored in the standby development tool 212. In particular, if the item was updated by another user during the time the item was being updated by the user's computing device 202, the item version number obtained from the shared repository 208 and stored in the standby development tool 212 may be higher than the item version number stored in the development tool 210. Thus, in operation 314, if the item version number in the development tool 210 is more than the item version number stored in the standby development tool 212, the changes made to the item by the user's computing device 202 and stored in the development tool may be committed in operation 316. Commitment of the altered item may include uploading the altered item to the shared repository 208 from the development tool 210, along with an updated item version number.

If the item version number in the development tool 210 is less than or equal to the item version number stored in the standby development tool 212, the computing system 204 may return to operation 306 by obtaining the latest version of the item from the shared repository and updating the item in the standby development tool 212 and the development tool 210 accessible by the user. By updating the item in the development tool 210, the user's computing device 202 and/or development tool 210 may update the latest version of the item with the changes initiated by the user. Once the latest version of the item is updated with the user's changes, the changes may attempt to be committed again through the operations described above in relation to FIG. 3.

Through the operations of the method described in the flowchart of FIG. 3, the computing system 204 may prevent conflicts in updated versions of an item in a shared repository 208. In particular, the computing system 204 may utilize a standby development tool 212 to maintain the latest version number of the shared item. Upon completion of the editing or updating of the item by a user, the computing system 204 may execute a pre-commit script or program that updates the standby development tool 212 with the latest version number of the item and checks the latest version number of the item with the version number of the item that is updated. In general, if the item version updated by the user is the latest version, than the user's changes are committed. If the item version updated by the user is out of date (or otherwise not the latest version of the item), the user's development tool may be updated with the latest version of the item and the changes may be applied to the latest version. The changes to the item may then be committed to the shared repository 208. In this manner, the changes to the item made by the user are committed to the proper version of the item in contrast to the instance above where the changes made by the user are lost. Thus, conflicts in updates to an item may be avoided through the use of the pre-commit script and the standby development tool 212 of the computing system 204.

Figure 5:
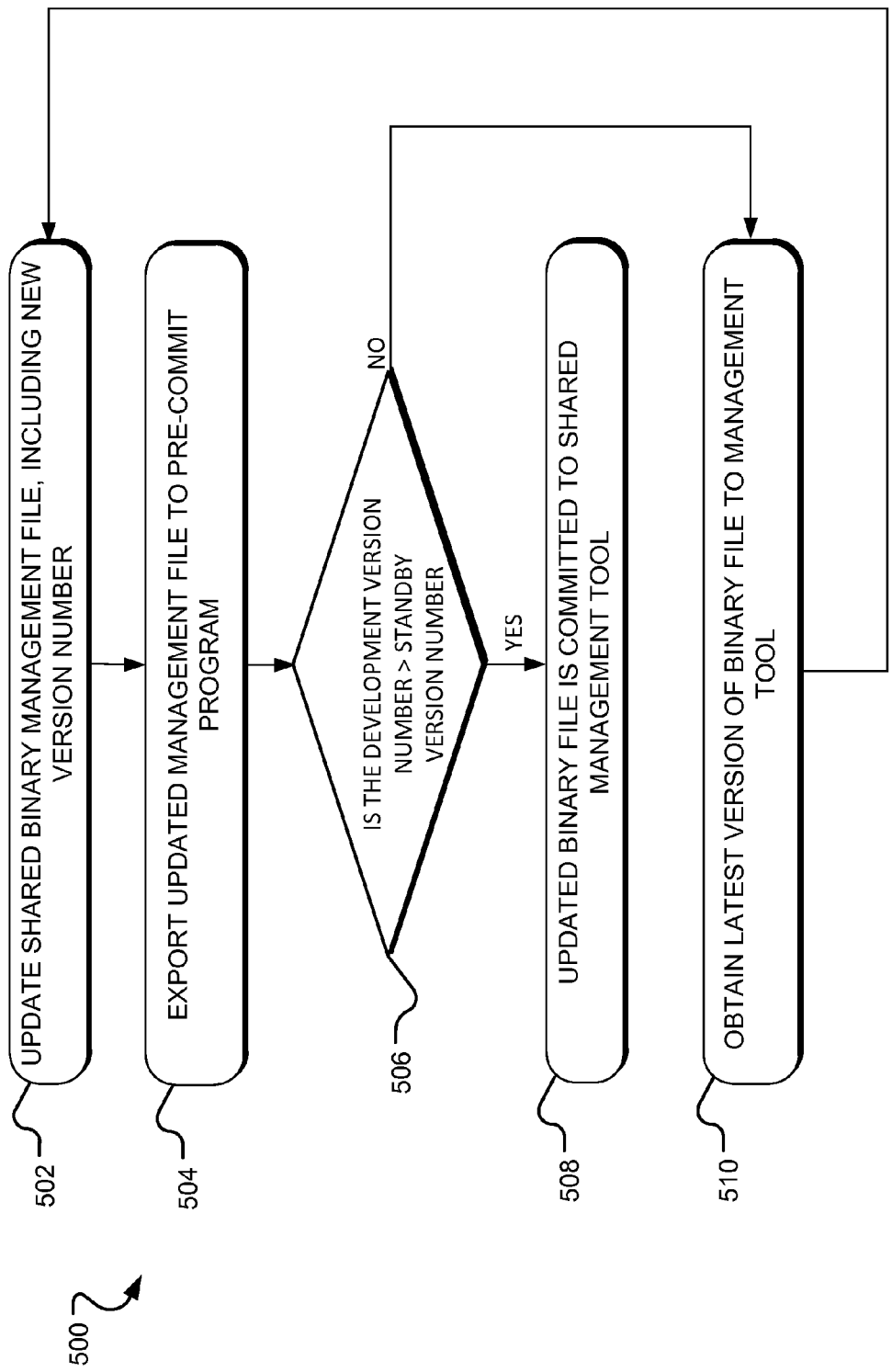
FIG. 5 is a flowchart of a method for a user of an infrastructure management tool to update or edit items of the management tool.

FIG. 5 is a flowchart of a method for a user's computing device of an infrastructure management tool to update or edit items of the management tool obtained from a shared repository 208. The operations of the method of FIG. 5 may be performed by the computing device 202 in response to one or more instructions provided to the computing device by a user. Reference is made herein to the computing environment 200 of FIG. 2 in describing one or more operations of the method. However, it should be appreciated that such operations may be executed in any computing environment.

Beginning in operation 502, the computing device 202 updates a shared binary file. Such a binary file may be obtained from a shared repository available to many user devices for updating and/or creating the shared binary files. Further, the binary file may be related to a management program for a converged infrastructure. Upon updating the binary file, the computing device 202 may export the updated file to a pre-commit program executed by a computing system 204. In general, the pre-commit program may be executed by the computing system 204 and/or the user's computing device 202 and stored in the local repository 206. In one embodiment, the pre-commit script is run from a command line of the computing system 204 or computing device 202 and operates to compare the item version number in the development tool 210 to the item version number of the standby development tool 212. Further, the pre-commit script, in one embodiment, may be a hook script that, once configured, automatically runs when changes to an item are attempted to be committed.

When executed, the hook script compares the item version number in the development tool 210 to the item version number of the standby development tool 212, as indicated in operation 506 of the method of FIG. 5. If the item version number in the development tool 210 is more than the item version number of the standby development tool 212, the computing device 212 may update the binary file in the shared repository 208 with the user's changes to the item. This is the circumstance where no conflict between versions of the item occurs. However, in some instances, a conflict may arise when the changes to the item are committed. In such cases, the computing device 202 is forced to update the development tool 210 to update the stale data in the tool. In particular, if the item version number in the development tool 210 is less than or equal to the item version number in the standby development tool 212, the computing device 202 obtains the latest version of the item from the shared repository 208 and stores the latest version in the local repository 206. The latest version of the item may also be updated into the development tool 210 so that the changes made by the user's device 202 to the item may be applied to the latest version of the item. In particular and as shown in FIG. 5, the computing device 202 moves to operation 502 to update the shared binary item and repeats the method of FIG. 5. Once the changes to the item are made, the pre-commit script may be executed again to commit the changes to the shared repository.

Through the systems and methods above, conflicts between versions of an editable binary file from a shared repository of system management files, workflows, and/or items may be avoided. In particular, a computing environment may include a development tool for altering the item and a standby development tool that maintains the latest version of the item. The computing environment is configured to execute a pre-commit script or program that checks a version number of the edited item to a version number of the item maintained by the standby development tool such that changes made to the item are only committed when the item has not been edited or changed by another user to the shared repository. In this manner, conflicts between versions of the binary file may be avoided such that each user's alterations to the file or item from the infrastructure management tool are properly committed.

Figure 6:
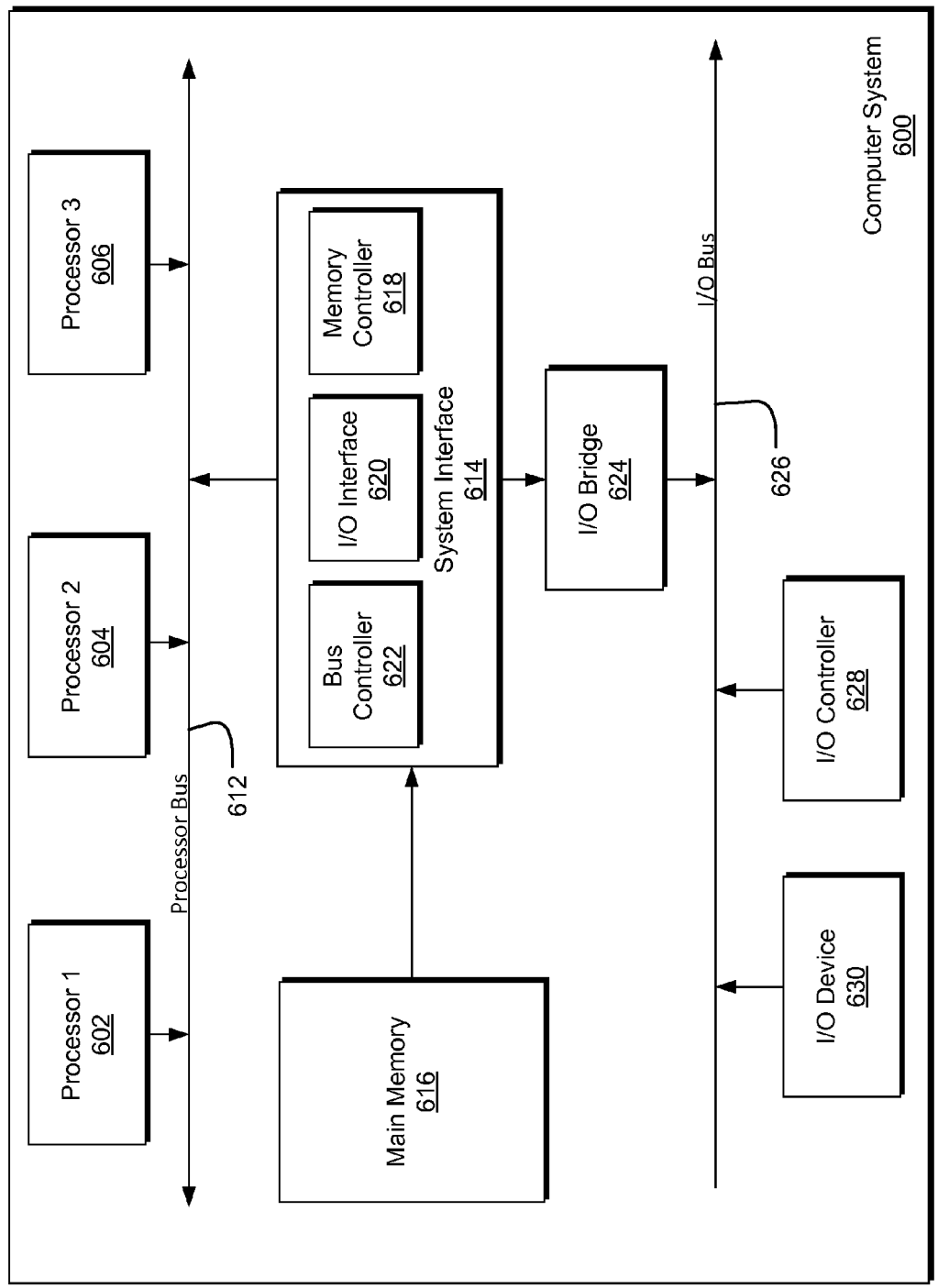
FIG. 6 shows an example computing system that may implement various systems and methods discussed herein, according to one implementation.

FIG. 6 is a block diagram illustrating an example of a computing device or computer system 600 which may be used in implementing the embodiments of the components of the computing environment 200 disclosed above. For example, the computing system 600 of FIG. 6 may be used to implement the various components of the computing system 204 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 640, as illustrated.

I/O device 640 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer, as described above with reference to FIG. 6.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed:

1. A method for managing a computing system, the method comprising:
obtaining a first binary file and a first version number of the first binary file from a shared repository, wherein the first binary file is an item of workflow, the workflow configured to manage one or more operations of a distributed computing system;
loading the first binary file and the first version number of the first binary file in a development tool program executed by a computing device, the development tool
program providing for editing of the first binary file;

receiving edits to the first binary file from the development tool program, the edits comprising an updated first version number of the first binary file;

storing a second version number of the first binary file in a local repository through a standby development tool program that functionally operates in a same manner as the development tool program and is executed by the computing device separately from the development tool program, the second version number of the first binary file obtained from the shared repository;

wherein the standby development tool program periodically stores the second version number of the first binary file in the local repository; and comparing file versions between the development tool program and the standby development tool program to update the shared repository, wherein updating the shared repository is based on a comparison of the updated first version number in the development tool program to the second version number in the standby development tool program and committing the edits to the first binary file in the shared repository if the updated first version number of the first binary file is more than the second version number of the first binary file.

2. The method of claim 1 further comprising:

obtaining a second binary file from the shared repository if the updated first version number of the first binary file is less than or equal to the second version number of the first binary file, the second binary file being an altered version of the first binary file.

3. The method of claim 2 further comprising updating the development tool program with the second binary file.

4. The method of claim 2 wherein the second binary file comprises:

one or more changes to the first binary file made by a user of the shared repository; and the second version number of the first binary file.

5. The method of claim 1 wherein comparing the updated first version number of the first binary file in the development tool program to the second version number of the first binary file in the standby development tool program comprises executing a pre-commit script configured to compare the updated first version number of the first binary file in the development tool program to the second version number of the first binary file in the standby development tool program.

6. The method of claim 1 wherein the edits to the first binary file correspond to one or more inputs provided by a user of a computing device in communication with the development tool program.

7. The method of claim 1 wherein the standby development tool program periodically stores the second version number of the first binary file in the local repository based at least on an input provided by a user of a computing device in communication with the standby development tool program.

8. The method of claim 1 wherein the updated first version number being more than the second version number indicates that the first binary file in the development tool program has not been committed to the shared repository.

9. One or more non-transitory tangible computer-readable storage media storing computer-executable instructions for performing a computer process on a computing system, the computer process comprising:

obtaining a first item and a first version number of the first item from a shared repository, wherein the first item being a first binary file is an item of workflow, the workflow configured to manage one or more operations a distributed computing system;

loading the first binary file and the first version number of the first binary file in a development tool program executed by a computing device, the development tool program providing for editing of the first binary file;

receiving an updated first version number of the first binary file from the development tool program, the updated first version number indicating edits made to the first binary file;

loading a second version number of the first binary file in a local repository through a standby development tool program that functionally operates in a same manner as the development tool program and is executed by the computing device separately from the development tool program, the second version number of the first binary file obtained from the shared repository;

wherein the standby development tool program periodically stores the second version number of the first binary file in the local repository; and comparing file versions between the development tool program and the standby development tool program to update the shared repository, wherein updating the shared repository is based on a comparison of the updated first version number in the development tool program to the second version number in the standby development tool program and committing the edits to the first binary file in the shared repository if the updated first version number of the first binary file is more than the second version number of the first binary file.

10. The one or more non-transitory tangible computer-readable storage media of claim 9 storing computer-executable instructions for performing a computer process on a computing system, the computer process further comprising:

obtaining a second binary file from the shared repository if the updated first version number of the first binary file is less than or equal to the second version number of the first binary file, a second item being an altered version of the first binary file.

11. The one or more non-transitory tangible computer-readable storage media of claim 10 storing computer-executable instructions for performing a computer process on a computing system, the computer process further comprising:

loading the second binary file into the development tool program; and applying the edits of the first binary file to the second binary file through the development tool program.

12. The one or more non-transitory tangible computer-readable storage media of claim 10 storing computer-executable instructions for performing a computer process on a computing system, wherein the second binary file comprises:

one or more changes to the first binary file made by a remote user of the shared repository; and the second version number of the first binary file.

13. The one or more non-transitory tangible computer-readable storage media of claim 9 storing computer-executable instructions for performing a computer process on a computing system, wherein comparing the updated first version number of the first binary file in the development tool program to the second version number of the first binary file in the standby development tool program comprises executing a pre-commit script configured to compare the updated first version number to the second version number of the first binary file.

14. The one or more non-transitory tangible computer-readable storage media of claim 9 storing computer-executable instructions for performing a computer process on a computing system wherein the edits to the first binary file correspond to one or more inputs provided by a user of a computing device in communication with the development tool program.

15. The one or more non-transitory tangible computer-readable storage media of claim 9 storing computer-executable instructions for performing a computer process on a computing system wherein the standby development tool program periodically accesses the shared repository to obtain the second version number of the first binary file and stores the second version number of the first binary file in the local repository.

16. A computer system for creating a workflow for managing a computing infrastructure, the computer system comprising:
 a shared repository storing a first binary file and a first version number of the first binary file, wherein the first binary file is an item of workflow, the workflow configured to manage one or more operations of a distributed computing infrastructure computing system;
 a local repository storing information received from a development tool program and a standby development tool program both executed on a computing device, wherein the standby development tool program functionally operates in a same manner as the development tool program and is executed separately from the development tool program;
 a non-transitory computer-readable storage media storing computer-executable instructions for performing a computer process on a computing system; and
 a processing device that, when executing the computer-executable instructions stored on the non-transitory computer-readable storage media, performs the computer process comprising:
  loading the first binary file and the first version number of the first binary file in the development tool program obtained from the shared repository;
  receiving edits to the first binary file from the development tool program, the edits comprising an updated first version number of the first binary file;
  storing a second version number of the first binary file in the local repository through the standby development tool program, the second version number of the first binary file obtained from the shared repository; and
  wherein the standby development tool program periodically stores the second version number of the first binary file in the local repository; and
  comparing file versions between the development tool program and the standby development tool program to update the shared repository from binary files across the distributed computing infrastructure computing system, wherein updating the shared repository is based on a comparison of the updated first version number in the development tool program to the second version number in the standby development tool program and committing the edits to the first binary file in the shared repository if the updated first version number of the first binary file is more than the second version number of the first binary file.

17. The computer system of claim 16 wherein the processing device, when executing the computer-executable instructions stored on the non-transitory computer-readable storage media, further performs the computer process comprising:
 obtaining a second binary file from the shared repository if the updated first version number of the first binary file is less than or equal to the second version number of the first binary file, the second binary file being an altered version of the first binary file.

* * * * *